US010928078B2

(12) United States Patent
Hrejsa et al.

(10) Patent No.: US 10,928,078 B2
(45) Date of Patent: Feb. 23, 2021

(54) FURNACE CONTROLLER AND A FURNACE THAT CONTROLS A GAS INPUT RATE TO MAINTAIN A DISCHARGE AIR TEMPERATURE

(71) Applicant: Lennox Industries Inc., Richardson, TX (US)

(72) Inventors: Peter Hrejsa, Frisco, TX (US); Glenn W. Kowald, Carrollton, TX (US); Darko Hadzidedic, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 303 days.

(21) Appl. No.: 15/486,885

(22) Filed: Apr. 13, 2017

(65) Prior Publication Data

US 2017/0219221 A1    Aug. 3, 2017

Related U.S. Application Data

(63) Continuation of application No. 13/605,375, filed on Sep. 6, 2012, now Pat. No. 9,625,177.

(51) Int. Cl.
*F24D 19/10* (2006.01)
*G05D 23/19* (2006.01)
(Continued)

(52) U.S. Cl.
CPC ........... *F24D 19/1084* (2013.01); *F24D 5/04* (2013.01); *F24H 3/065* (2013.01); *F24H 9/2085* (2013.01); *G05D 23/1932* (2013.01); *Y02B 30/70* (2013.01)

(58) Field of Classification Search
CPC . F23N 1/02; F23N 1/025; F23N 1/027; F23N 5/184; F23N 5/185; F24H 9/2085; F24H 9/20
(Continued)

(56) References Cited

U.S. PATENT DOCUMENTS 4,677,357 A * 6/1987 Spence .............. G05D 23/1906
388/816
5,255,530 A   10/1993 Janke
(Continued)

OTHER PUBLICATIONS

United States Patent and Trademark Office; Non-Final Office Action issued for related U.S. Appl. No. 13/605,375; dated Jul. 27, 2015.
(Continued)

*Primary Examiner* — Nelson J Nieves
*Assistant Examiner* — Meraj A Shaikh
(74) *Attorney, Agent, or Firm* — Baker Botts L.L.P.

(57) ABSTRACT

Provided herein are embodiments of, a multistage gas furnace, a controller therefor and a computer-usable medium having non-transitory computer readable instructions stored thereon for execution by a processor to perform a method for operating a gas furnace. In one embodiment, the gas furnace includes: (1) a burner, (2) a circulation fan and (3) a furnace controller. The furnace controller having: (3A) an interface configured to receive heating calls and a blower control signal, the blower control signal corresponding to an operating speed of the circulation fan and (3B) a processor configured to respond to the heating calls and the blower control signal by setting and adjusting a gas input rate for the burner that is based on the blower control signal and that corresponds to a discharge air temperature determined by a dedicated discharge air sensor associated with the furnace.

12 Claims, 2 Drawing Sheets

FIG. 3

(51) Int. Cl.
  *F24D 5/04*   (2006.01)
  *F24H 9/20*   (2006.01)
  *F24H 3/06*   (2006.01)
(58) Field of Classification Search
  USPC .................................. 236/11; 126/116 A
  See application file for complete search history.

(56) References Cited

U.S. PATENT DOCUMENTS

| | | | |
|---|---|---|---|
| 5,590,642 A * | 1/1997 | Borgeson | F24H 9/2085 |
| | | | 126/110 R |
| 7,101,172 B2 | 9/2006 | Jaeschke | |
| 7,731,096 B2 | 6/2010 | Lorenz | |
| 2004/0043345 A1* | 3/2004 | Jaeschke | F23N 5/18 |
| | | | 431/18 |
| 2005/0048427 A1* | 3/2005 | Brown | F23L 17/005 |
| | | | 431/20 |
| 2013/0137052 A1* | 5/2013 | Laskowski | F23K 3/14 |
| | | | 431/12 |
| 2013/0255604 A1* | 10/2013 | Rollinger | F01P 7/048 |
| | | | 123/41.15 |

OTHER PUBLICATIONS

United States Patent and Trademark Office; Final Office Action issued for related U.S. Appl. No. 13/605,375; dated Jun. 30, 2016.
United States Patent and Trademark Office; Notice of Allowance issued for related U.S. Appl. No. 13/605,375; dated Dec. 16, 2016.
Canadian Intellectual Property Office, Canadian Office Action, Application No. 2,826,346, dated Aug. 27, 2019, 4 pages.

* cited by examiner

FURNACE CONTROLLER AND A FURNACE THAT CONTROLS A GAS INPUT RATE TO MAINTAIN A DISCHARGE AIR TEMPERATURE

RELATED APPLICATIONS

This application is a continuation of U.S. patent application Ser. No. 13/605,375 filed Sep. 6, 2012 and entitled "Furnace Controller and a Furnace that Controls a Gas Input Rate to Maintain a Discharge Air Temperature," and which is incorporated herein by reference.

TECHNICAL FIELD

This application is directed, in general, to furnaces and, more specifically, to controlling the operation of furnaces.

BACKGROUND

HVAC systems can be used to regulate the environment within an enclosure. Typically, a circulating fan is used to pull air from the enclosure into the HVAC system through ducts and push the air back into the enclosure through additional ducts after conditioning the air (e.g., heating or cooling the air). For example, a gas furnace, such as a residential gas furnace, is used in a heating system to heat the air. Some gas furnaces are modulating or two-stage gas furnaces that can operate at different speeds compared to a single stage furnace that runs at one speed, i.e., full speed. The modulating furnaces can operate more efficiently compared to conventional single stage furnaces and reduce energy costs.

In addition to modulating furnaces, some HVAC systems also use zone controls. A zone controlled system allows a user to independently control the temperature in various designated zones of an enclosure, such as a house. A zone control panel or zone controller manages the movement of conditioned air to the various zones using electronic dampers and thermostats dedicated to each of the zones. Harmony III™ Zone Control System available from Lennox Industries, Inc. of Richardson, Tex., is an example of a zoning system that manages the distribution of conditioned air to designated zones.

SUMMARY

In one aspect, the disclosure provides a controller for a multistage gas furnace having a circulation fan and a dedicated discharge air sensor associated therewith. In one embodiment, the controller includes: (1) an interface configured to receive heating calls and a blower control signal, the blower control signal corresponding to an operating speed of the circulation fan; and (2) a processor configured to respond to the heating calls and the blower control signal by setting a gas input rate for the furnace that is based on the blower control signal and that corresponds to a discharge air temperature determined by the discharge air sensor.

In another aspect, the disclosure provides a computer-usable medium having non-transitory computer readable instructions stored thereon for execution by a processor to perform a method for operating a gas furnace. In one embodiment the method includes: (1) igniting the furnace in response to receiving a heating call, (2) operating the circulation fan at an operating speed according to a blower control signal, (3) setting a gas input rate for the furnace that is based on the blower control signal and that corresponds to a discharge air temperature determined by a discharge air sensor associated with the furnace and (4) adjusting the gas input rate to maintain the discharge air temperature in response to the blower control signal.

In yet another aspect, the disclosure provides a multistage gas furnace. In one embodiment, the gas furnace includes: (1) a burner, (2) a circulation fan and (3) a furnace controller. The furnace controller having: (3A) an interface configured to receive heating calls and a blower control signal, the blower control signal corresponding to an operating speed of the circulation fan and (3B) a processor configured to respond to the heating calls and the blower control signal by setting and adjusting a gas input rate for the burner that is based on the blower control signal and that corresponds to a discharge air temperature determined by a dedicated discharge air sensor associated with the furnace.

BRIEF DESCRIPTION

Reference is now made to the following descriptions taken in conjunction with the accompanying drawings, in which.

DETAILED DESCRIPTION

Figure 1:
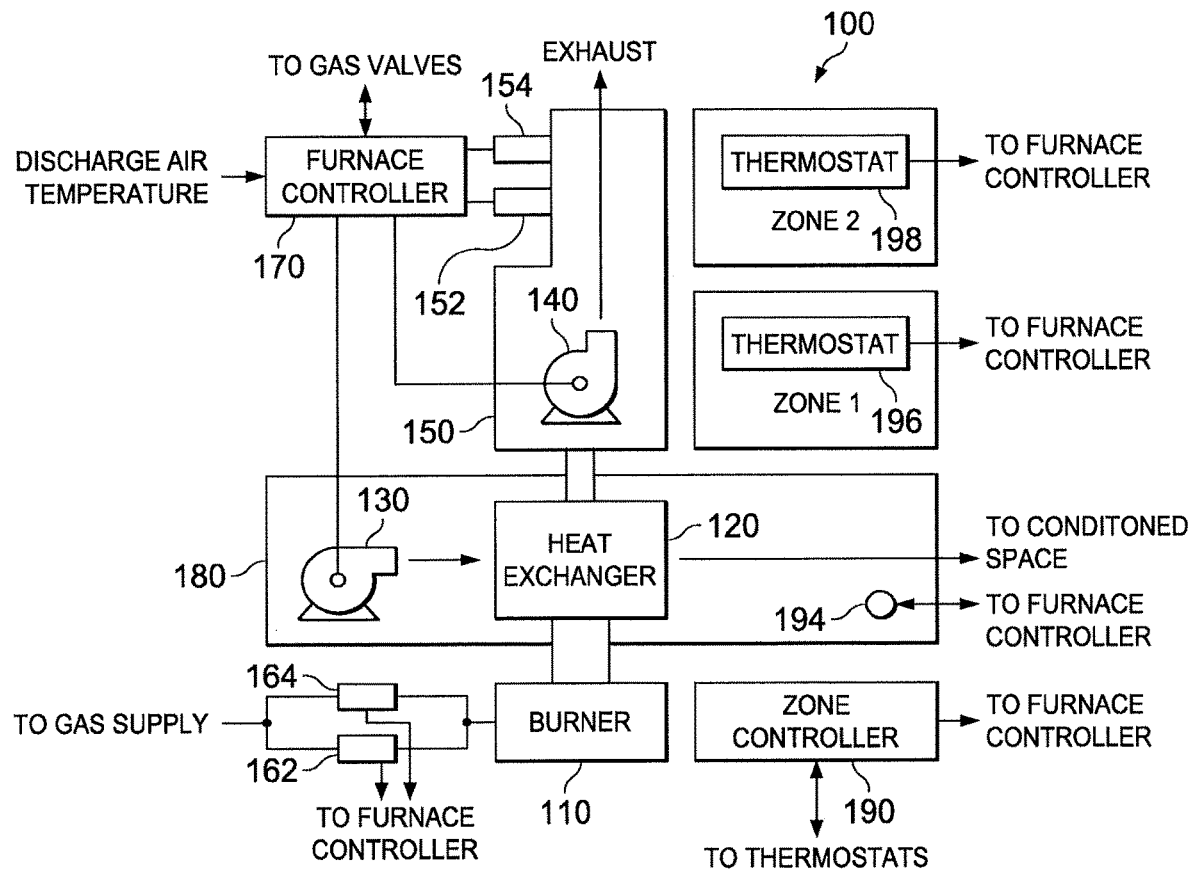
FIG. 1 illustrates a diagram of an embodiment of a furnace constructed according to the principles of the disclosure.

In a zone controlled system, a zone controller generates a blower control signal to control the operating speed of a circulation fan. As such, the blower control signal is used to control the blower volume (e.g., cubic feet per minute (CFM)) of the circulation fan. The blower control signal typically changes in a zone controlled system when demand changes to different or more zones. For example, a thermostat in a first zone may demand heat. As such, the furnace initiates and provides heat for the first zone based on the heating call and an operating speed for the circulation fan for the first zone. A thermostat for a second zone then demands heat. Accordingly, the furnace continues to provide heat with an operating speed of the circulation fan based on the blower control signal generated by the zone controller for both the first and second zones. The blower control signal is typically an electrical signal generated by a zoning control panel in response to thermostat demands from different zones. The blower control signal can be an analog or a digital signal. Considering the Harmony III™ Zone Control System, a pulse width modulated (PWM) signal is used for a blower control signal and a change in the duty cycle of the PWM signal indicates a change in the operating speed of the circulation fan. In other embodiments, the blower control signal can be a data signal including a messaging protocol signal, such as a controller area network (CAN) signal, or an output of a transducer.

Disclosed herein is a heating system configured to maintain a discharge air temperature of a furnace by adjusting the gas input rate thereof. By maintaining the discharge air temperature through adjusting the gas input rate, the furnace can prevent or at least reduce the occurrence of overshooting a desired temperature in a particular zone. In one embodiment, a control scheme for a furnace is disclosed that reacts to a first stage heating call W1 by determining a gas input rate for a discharge air temperature based on a blower control signal. The gas input rate can be determined from a pre-programmed look-up table that corresponds to an operating point (or targeted discharge air temperature) based on the blower volume requested by the blower control signal. In one embodiment, the operating point is determined from a predefined temperature rise of return air to supply air, such as a midpoint of the temperature rise. A single table or multiple tables may be used when determining the gas input rate.

In response to a second heating call W2, the gas input rate can be increased after a delay timer expires and reduced after expiration of the delay timer when the W2 heating call is not present. In one embodiment, the W2 heating call input may not be connected to the furnace controller. In this embodiment, the furnace is prevented from increasing the input rate within the same duty cycle heating call. In such embodiments, the firing rate of the furnace can be adjusted for a given duty cycle to provide a hotter discharge air temperature. Embodiments of a controller, such as an integrated furnace controller, a heating system and a method of operating a furnace based on maintaining a discharge air temperature are disclosed herein.

FIG. 1 is a block diagram of an embodiment of a heating system 100 constructed according to the principles of the disclosure. The heating system 100 includes a furnace 101, a zone controller 190, a discharge air sensor (DAS) 194, and thermostats 196, 198. The heating system 100 includes two operating zones, Zone 1 and Zone 2. As such, the heating system 100 is a zoned system. One skilled in the art will understand that the principles of the disclosure also apply to heating systems having more than two zones.

The furnace 101 is a combustible fuel-air burning furnace, such as, a natural gas furnace or a propane furnace. The furnace 101 may be for a residence or for a commercial building (i.e., a residential or commercial unit). Additionally, the furnace 101 is a two-stage furnace having a two-stage control that uses a two-stage adjustment of the furnace input rate in response to changes in the heating load. Based on thermostat demand, the two-stage control cycles the burners between a reduced heat input rate and off or between the maximum heat input rate and off.

The furnace 101 includes a burner assembly 110, a heat exchanger 120, an air circulation fan 130, a combustion air inducer 140, a low pressure switch 152, a high pressure switch 154, a low fire gas valve 162, a high fire gas valve 164 and a furnace controller 170. Portions of the furnace 101 may be contained within a cabinet 180. In some embodiments, the furnace controller 170 may also be included in the cabinet 180. One skilled in the art will understand that the furnace 101 may include additional components and devices that are not presently illustrated or discussed but are typically included in a furnace.

The burner assembly 110 includes a plurality of burners that are configured for burning a combustible fuel-air mixture (e.g., gas-air mixture) and provide a combustion product to the heat exchanger 120. The heat exchanger 120 is configured to receive the combustion product from the burner assembly 110 and use the combustion product to heat air that is blown across the heat exchanger 120 by the indoor circulation fan 130. The indoor circulation fan 130 is configured to circulate air through the cabinet 180, whereby the circulated air is heated by heat exchanger 120 and supplied to conditioned space. The combustion air inducer 140 is configured to supply combustion air to the burner assembly 110 by an induced draft and is also used to exhaust products of combustion from the furnace 101. The indoor circulation fan 130 and the inducer 140 are each operable in at least two speed settings corresponding to the at least two modes of operation (i.e., two stages of operation) of the furnace 101.

The low pressure switch 152 and the high pressure switch 154 measure combustion air pressure on the discharge side of the combustion air inducer 140. One skilled in the art will understand the operation and configuration of these pressure switches and that pressure may also be measured at other points in the heat exchanger 120 or as a differential pressure across a flow limiting orifice in the heat train.

The furnace 101 is a multi-stage or variable input furnace operable in at least two modes of operation (e.g., low fire and high fire modes). Assuming two stages or two modes of operation, the furnace 101 also includes the low fire gas valve 162 and the high fire gas valve 164. In low fire operation, only the low fire gas valve 162 is opened to supply fuel to burner assembly 110. In high fire operation, both the low fire gas valve 162 and the high fire gas valve 164 are open to supply more fuel to burner assembly 110. One skilled in the art will understand that more gas valves and/or a different combination or arrangement of gas valves may be employed to supply fuel for multiple operation stages.

The furnace controller 170 is configured to control the operation of the furnace 101 including the combustion air inducer 140 and the indoor circulation fan 130, respectively. Additionally, furnace controller 170 controls operation of the low fire gas valve 162, the high fire gas valve 164 including controlling the gas input rate to the burner 110. In some embodiments, the furnace controller 170 may include a designated burner control board and an air blower control board for controlling the gas valves 162, 164, the combustion air inducer 140 and the indoor circulation fan 130. In other embodiments, the burner control board and the air blower control board may be physically separated from each other or the furnace controller 170 with the furnace controller 170 communicating therewith to control operation of the gas valves 162, 164, the combustion air inducer 140, and the indoor air circulation fan 130. As such, the furnace controller 170 may be an integrated controller or a distributed controller that directs operation of the furnace 101.

The furnace controller 170 is configured to adjust the gas input rate of the furnace 101 to maintain a discharge air temperature of the furnace 101. Thus, in one embodiment, the furnace controller 170 can be configured to adjust the gas input rate of the furnace 101 to hold the discharge air temperature at a designated temperature. As such, the furnace 101 can reduce overshooting a desired temperature in a designated zone of an conditioned space.

The furnace controller 170 may include an interface to receive heating calls and a blower control signal, and a processor, such as a microprocessor, to direct the operation of the furnace 101. In one embodiment, the furnace controller 170 is installed without a second heating call W2 connection but instead employs a single heating call to direct the operation of the furnace 101.

The furnace controller 170 may include a memory section having a series of operating instructions stored therein that direct the operation of the furnace controller 170 (e.g., the processor) when initiated thereby. The series of operating instructions may represent algorithms that are used to prevent or reduce temperature overshooting in the conditioned space. For example, the algorithms can implement the method illustrated in FIG. 3. The furnace controller 170 also includes or communicates with a delay timer. The delay timer can be a conventional clock that can be reset and can be used to keep track of a designated amount of time that is used to allow settling of discharge air temperatures. In some embodiments, the designated amount of time is two minutes. As illustrated in FIG. 1, the furnace controller 170 is coupled to the zone controller 190, the DAS 194, the thermostats 196, 198 and components of the furnace 101. In some embodiments, the connections therebetween are through a wired-connection. A conventional cable and contacts may be used to couple the furnace controller 170 to the various components of the furnace 100. In some embodiments, a wireless connection may also be employed to provide at least some of the connections.

The DAS 194 may be a conventional temperature sensor configured to determine the ambient temperature of the area where positioned and provide this temperature data to the furnace controller 170 to use in directing the operation of the furnace 100. The DAS 194 is a temperature sensor that is designated and positioned to determine the discharge air temperature of the furnace 101. In FIG. 1, the DAS 194 is located in the cabinet 180. In other embodiments, the DAS 194 can be positioned in other locations to measure the discharge air temperature of the furnace 100. For example, the DAS 194 can be positioned in a duct (not illustrated) between the cabinet and the conditioned space. In some embodiments, multiple temperature sensors can be used and an average discharge air temperature determined therefrom. The discharge air sensor 194 can be, for example, a 10 k Negative Temperature Coefficient (NTC) sensor.

The thermostats 196, 198, can be a conventional thermostats employed in HVAC systems that generate heating calls based on temperature settings. Each of the thermostats 196, 198, is a user interface that allows a user to input a desired temperature for a designated area or zone of the conditioned space. Thermostat 196 is designated for Zone 1 and thermostat 198 is designated for Zone 2. In addition to being connected to the furnace controller 170, the thermostats 196, 198, are also connected to the zone controller 190 in a typical conventional configuration.

The zone controller 190 is configured to manage conditioned air for designated zones of a conditioned space. A zone is a portion of a HVAC system that includes at least one demand unit, such as the furnace 101, and includes at least one user interface, such as the thermostat 196 or 198. The zone controller 190 operates electronic dampers (not illustrated) to control air flow to Zone 1 and Zone 2 of the conditioned space. The zone controller 190 generates a blower control signal to request a blower volume for the circulation fan 130. In some embodiments, the zone controller 190 is configured to provide greater air flow to Zone 1 than Zone 2 to compensate for greater heating load or air flow requirements. As such, the blower control signal requests a greater blower volume with respect to a heating call for Zone 1 than for Zone 2. The zone controller 190 can be a conventional controller for delivering conditioned air to designated zones of a conditioned space. For example, the zone controller 190 can be a Harmony III™ Zone Controller.

Figure 2:
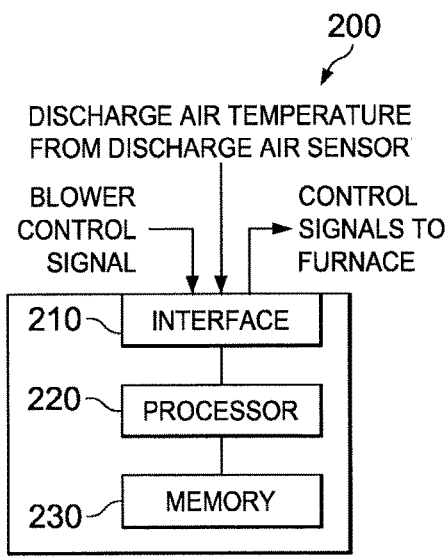
FIG. 2 illustrates a block diagram of an embodiment of a controller constructed according to the principles of the disclosure.

FIG. 2 illustrates a block diagram of an embodiment of a furnace controller 200 constructed according to the principles of the disclosure. The furnace controller 200 is configured to direct the operation of or at least part of the operation of a furnace, such as the furnace 101. As such, the furnace controller 200 is configured to generate control signals that are transmitted to the various components to direct the operation thereof. The furnace controller 200 may generate the control signals in response to feedback data and/or operating data that is received from various sensors and/or components of a heating system, such as a DAS, thermostats, zone controllers or comfort sensors. For example, furnace controller 200 can generate a control signal to operate the gas valves of a furnace to control the gas input rate to a burner of the furnace. The furnace controller 200 includes an interface 210 that is configured to receive and transmit the feedback data, operating data and control signals. The operating data received by the interface 210 includes a discharge air temperature and a blower control signal. The interface 210 may be a conventional interface that is used to communicate (i.e., receive and transmit) data for a controller, such as a microcontroller.

The furnace controller 200 also includes a processor 220 and a memory 230. The memory 230 may be a conventional memory typically located within a controller, such as a microcontroller, that is constructed to store data and computer programs. The memory 230 may store operating instructions to direct the operation of the processor 220 when initiated thereby. The operating instructions may correspond to algorithms that provide the functionality of the operating schemes disclosed herein. For example, the operating instructions may correspond to the algorithm or algorithms that implement the method illustrated in FIG. 3. The processor 220 may be a conventional processor such as a microprocessor. The interface 210, processor 220 and memory 230 may be coupled together via conventional means to communicate information. The furnace controller 200 may also include additional components typically included within a controller for a furnace, such as a power supply or power port.

The memory 220 is configured to store gas input rates with respect to blower volumes represented by blower control signals. The gas input rates correspond to discharge air temperatures of the furnace. In one embodiment, the gas input rates correspond to a predefined temperature rise, such as a midpoint thereof, based on the blower volume requested per the blower control signal. The stored values can be pre-programmed in the memory 220 during manufacturing or installation and can be based on the model or type of furnace. A table or tables, such as a look-up table, may store the various gas input rates and corresponding blower volumes.

The processor 230 is configured to operate the furnace by controlling the gas input rate to maintain a discharge air temperature for the furnace in response to the received heating calls and the blower control signal. In one embodiment, the processor 230 is configured to operate the furnace according to the method illustrated in FIG. 3.

Figure 3:
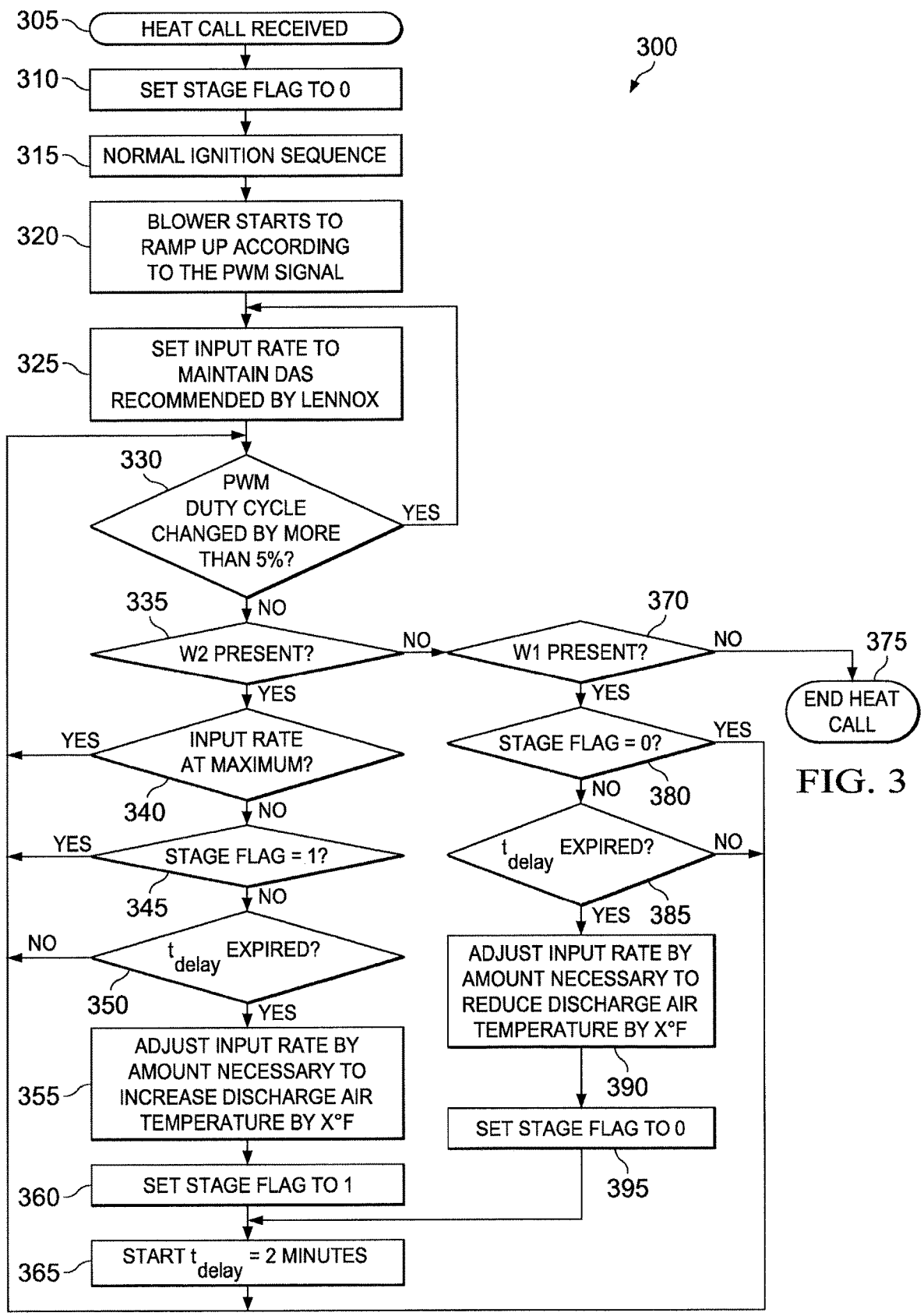
FIG. 3 illustrates a flow diagram of an embodiment of method of operating a furnace carried out according to the principles of the disclosure.

FIG. 3 illustrates a flow diagram of a method 300 of operating a furnace carried out according to the principles of the disclosure. The furnace controller 170 of FIG. 1 or the furnace controller 200 of FIG. 2 may be used to perform the method 300. The method 300 includes adjusting the input rate of the furnace to maintain a discharge air temperature. The method 300 begins in a step 305.

In a step 305, a heating call is received. The heating call can be a conventional request for a first stage of heat initiated by, for example, a thermostat of a HVAC system. Typically, the heating call for the first stage of heat is represented by W1. The thermostat can be associated with a zone controller of the HVAC system.

A temperature stage flag for the HVAC system is set to a first stage in a step 310. The temperature stage flag is set to the first stage to indicate a first discharge air temperature. In one embodiment, the temperature stage flag is set in response to the heating call. In one embodiment a furnace controller sets the temperature stage flag to zero for the first discharge air temperature.

In a step 315, the ignition sequence for the furnace is initiated. The ignition sequence for the furnace can be a conventional start-up sequence for a furnace. For example, considering a first stage (i.e., W1) heating call, circuits of the furnace associated with a first operating stage are activated.

The circulation fan begins to ramp-up in a step 320 according to a received blower control signal. The blower control signal represents a requested blower volume, e.g., CFM, for the circulation fan. The blower control signal is typically an electrical signal such as a pulse width modulated signal generated by a zone controller.

In a step 325, a discharge air temperature is selected based on the blower control signal and a gas input rate for the furnace is selected that corresponds to the discharge air temperature. A particular gas input rate for a designated discharge air temperature can be determined during manufacturing of the furnace and calibrated during installation with respect to a particular discharge air sensor that is used to determine the discharge air temperature of the furnace. A table can be used to store the various gas input rates with related blower volumes and discharge air temperatures. The actual discharge air temperature is determined by a discharge air sensor associated with the furnace. The gas input rate can change to maintain or hold the discharge air temperature. This changing of the gas input rate corresponds to an inner control loop of cascaded control loops. The outer control loop of the cascaded control loops is selecting the discharge air temperature from the blower control signal (e.g., per the requested blower volume).

In a first decisional step 330, a determination is made if the blower control signal has changed by a predetermined amount. For example, a determination is made if the operating speed or blower volume of the circulation fan has changed by a predetermined amount. In one embodiment, determining a change is based on the duty cycle of the blower control signal. In some embodiments, a determination is made if the duty cycle has changed by a certain percentage, such as five percent as indicated in the illustrated embodiment. Thus, for example, the circulation fan may initially operate at a duty cycle of 60 percent in step 320 and in step 330, a determination is made if the duty cycle of the circulation fan has changed to more than 65 percent.

If the blower control signal has changed by the predetermined amount, e.g., greater than five percent of the duty cycle, the method 300 returns to step 325 wherein the gas input rate is set or adjusted to correspond to a discharge air temperature determined by the blower control signal that has changed (e.g., a new discharge air temperature per the outer control loop). The gas input rate is selected to maintain or hold the new discharge air temperature (i.e., per the inner control loop). For example, a new discharge air temperature is selected based on the blower control signal change greater than the predetermined amount and adjustment of the gas input rate is performed to maintain this new discharge air temperature per the discharge air sensor.

If the blower control signal has not changed by the predetermined amount, a determination is made in a second decisional step 335 if a second stage heating call (W2) is present. If so, the method 300 continues to a third decisional step 340 where a determination is made if the gas input rate is set at its maximum value. As such, a determination is made if gas input rate is set at 100 percent of its determined rate. If so, the method 300 continues to step 330. If not at 100 percent, the method 300 continues to a fourth decisional step 345 where a determination is made if the discharge air temperature (i.e., targeted discharge air temperature) has been increased to a second discharge air temperature. In one embodiment, this determination is made based on if the temperature stage flag is set to one as noted in step 345 of FIG. 3. In some embodiments, multiple iterations could occur wherein the gas input rate is increased. As such, the temperature stage flag could be ignored.

If so, the method 300 continues to step 330. If not, a determination is made in the fifth decisional step 350 if a delay timer has expired.

If not, the method 300 continues to step 330. If the delay timer has expired, the gas input rate is adjusted to an amount that corresponds to a predetermined increase of the discharge air temperature in a step 355. In one embodiment, the predetermined increase of the discharge air temperature can be within a range of two to five degrees. For example, if the first discharge air temperature is seventy degrees Fahrenheit (e.g., temperature stage flag=0) and the predetermined temperature increase is 2 degrees Fahrenheit, the gas input rate can be increased to a rate that corresponds to a second discharge air temperature of seventy two degrees Fahrenheit (e.g., temperature stage flag=1).

In a step 360, the temperature stage flag is set to one to indicate the second discharge air temperature. The delay timer is then reset in a step 365. In one embodiment, the delay timer is set to two minutes as indicated in step 365 of FIG. 3. The delay timer can be located internally with a furnace controller or associated therewith. From step 365, the method 300 continues to step 330.

Returning now to the second decisional step 335, if the second stage heating call W2 is not present, a determination is then made in a sixth decisional step 370 if the first stage heating call W1 is present. If not, the method 300 continues to step 375 where the call for heat and the method 300 ends. In furnace installations wherein the W2 heating call is not connected to the furnace controller, then the second heating call W2 will not be present at step 335. As such, in these installations the method 300 would always continue to step 370 from step 335.

If the first stage heating call is present, a determination is made in the seventh decisional step 380 if the discharge air temperature is the first discharge air temperature. As illustrated in step 380 of FIG. 3, this determination is made in one embodiment by determining if the temperature stage flag is set to zero.

If so, the method continues to step 330. If not, the method 300 continues to an eighth decisional step 385 and a determination is made if the delay timer has expired. If not, the method 300 continues to step 330. If so, the gas input rate is adjusted to correspond to a predetermined reduction of the discharge air temperature in step 390. In some embodiments, the gas input rate is adjusted (e.g., reduced) to reduce the discharge air temperature by two to five degrees as represented by "X" in step 390 of FIG. 3. In some embodiments, the gas input rate can be adjusted as in step 390 when determining that the discharge air temperature is the first discharge air temperature in step 380.

The temperature stage flag is then set to indicate the first discharge air temperature in a step 395. The method 300 then continues to step 365.

The above-described methods may be embodied in or performed by various conventional digital data processors, microprocessors or computing devices, wherein these devices are programmed or store executable programs of sequences of software instructions to perform one or more of the steps of the methods, e.g., steps of the method of FIG. 3. The software instructions of such programs may be encoded in machine-executable form on conventional digital data storage media that is non-transitory, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods, e.g., one or more of the steps of the method of FIG. 3. Additionally, an apparatus, such as dedicated furnace controller, may be designed to include the necessary circuitry or programming to perform each step of the method of FIG. 3 and include a memory to store a data table for obtaining operating values such as gas input rates.

Those skilled in the art to which this application relates will appreciate that other and further additions, deletions, substitutions and modifications may be made to the described embodiments.

What is claimed is:

1. A method, comprising:
receiving a first heating call by a controller, the first heating call comprising a request for a multistage gas furnace to provide heating to a space;
receiving a blower control signal by the controller, said blower control signal indicating an operating speed of a circulation fan coupled to the multistage gas furnace;
determining, by the controller, a target discharge air temperature in response to receiving the first heating call, the target discharge air temperature determined based on the blower control signal that indicates the operating speed of the circulation fan coupled to the multistage furnace;
determining and setting, by the controller, a gas input rate for the multistage furnace according to outer loop control, wherein the outer loop control determines the gas input rate using one or more lookup tables that relate the gas input rate to the target discharge air temperature determined based on the blower control signal; and
determining and setting, by the controller, an adjustment to the gas input rate for the multistage furnace according to inner loop control, the inner loop control configured to maintain a measured discharge air temperature at the target discharge air temperature based on feedback data from a discharge air temperature sensor.

2. The method of claim 1, wherein setting the gas input rate according to outer loop control comprises setting the gas input rate at a predetermined nominal rate that corresponds to the determined target discharge air temperature.

3. The method of claim 1, further comprising receiving a second heating call and increasing the gas input rate by a predetermined amount to correspond to a predetermined temperature increase amount of said target discharge air temperature.

4. The method of claim 3, wherein said predetermined temperature increase amount is within a range of two to five degrees.

5. The method of claim 3, further comprising delaying a response to said second heating call until after expiration of a delay timer.

6. The method of claim 1, further comprising determining that a second heating call is not received prior to expiry of a delay timer and, in response to determining that the second heating call is not received prior to expiry of the delay timer, reducing the gas input rate by a designated amount that corresponds to a predetermined decrease amount of the target discharge air temperature.

7. The method of claim 1, wherein said blower control signal is a pulse width modulated signal for regulating blower volume for said circulation fan.

8. The method of claim 1, wherein said blower control signal is generated by a zone controller associated with said multistage furnace.

9. The method of claim 1, further comprising reducing the gas input rate a designated amount that corresponds to a predetermined decrease amount of the target discharge air temperature when the first heating call is removed and another heating call remains present.

10. The method of claim 1, further comprising adjusting the gas input rate to maintain the measured discharge air temperature within a designated temperature range.

11. The method of claim 1, further comprising adjusting the gas input rate to maintain the measured discharge air temperature in response to a predetermined amount of change in the operating speed of the circulation fan.

12. The method of claim 11, wherein the predetermined amount of change is a five percent change in a duty cycle of said blower control signal.

* * * * *